United States Patent
Langlois

(10) Patent No.: US 7,751,543 B1
(45) Date of Patent: Jul. 6, 2010

(54) SYSTEM AND METHOD FOR BUTTON-INDEPENDENT DISPATCH COMMUNICATIONS

(75) Inventor: Peter R. Langlois, Leesburg, VA (US)

(73) Assignee: Nextel Communications Inc,, Reston, VA (US)

( * ) Notice: Subject to any disclaimer, the term of this patent is extended or adjusted under 35 U.S.C. 154(b) by 1100 days.

(21) Appl. No.: 11/415,305

(22) Filed: May 2, 2006

(51) Int. Cl.
- H04M 3/42 (2006.01)
- H04M 1/00 (2006.01)
- H04M 9/00 (2006.01)
- H04B 7/00 (2006.01)
- H04B 1/38 (2006.01)

(52) U.S. Cl. ............ 379/202.01; 379/204.01; 379/433.06; 455/90.2; 455/518

(58) Field of Classification Search ........ 379/188, 379/202.01, 433.06, 204.01; 704/215; 455/79, 455/90.2, 518
See application file for complete search history.

(56) References Cited

U.S. PATENT DOCUMENTS

| 6,922,473 | B2 | 7/2005 | Turnbull |
| 6,959,203 | B2 | 10/2005 | Claxton et al. |
| 6,993,365 | B2 | 1/2006 | Fujino et al. |
| 2005/0227657 | A1 | 10/2005 | Frankkila et al. |
| 2005/0245203 | A1* | 11/2005 | Vance .................. 455/79 |
| 2006/0136201 | A1* | 6/2006 | Landron et al. ......... 704/215 |

* cited by examiner

*Primary Examiner*—Thjuan K Addy

(57) ABSTRACT

Systems and methods for button-independent dispatch communications are provided. A dispatch station monitors a microphone input to determine whether it provides voice information. When the input provides voice information, the dispatch station then determines whether the floor of the dispatch communication is open. When the floor is open, the dispatch station seizes the floor and transmits the voice information. When the floor is not open, the dispatch station can store the voice information and transmit it once the dispatch station is able to seize the floor.

16 Claims, 4 Drawing Sheets

200

SYSTEM AND METHOD FOR BUTTON-INDEPENDENT DISPATCH COMMUNICATIONS

BACKGROUND OF THE INVENTION

Voice communications in wireless networks are provided as either interconnect or dispatch voice communications. Interconnect voice communication is commonly considered circuit-switched or "cellular" communications and is full-duplex. Dispatch voice communication is commonly referred to as "walkie-talkie" or "push-to-talk" communications and is half-duplex. Dispatch stations include a "push-to-talk" button, the actuation of which is required in order to seize the "floor" of the conversation and talk.

FIG. 1 illustrates a conventional method for a dispatch communication by a dispatch station. When the dispatch (push-to-talk) button is actuated (step 105), the dispatch station determines whether the floor of the conversation is open (step 110). When the floor is not open ("No" path out of decision step 110), e.g., the other party to the conversation has the dispatch button of their dispatch station actuated, the dispatch station will output a failure tone (step 115). When the floor is open ("Yes" path out of decision step 110), then the dispatch station seizes the floor (step 120), receives the voice (step 125) and determines whether the button has been released (step 130). When the button has not been released ("No" path out of decision step 130), then the dispatch station continues to maintain the floor and receive voice information (step 125). When the button is released ("Yes" path out of decision step 130), then the dispatch station transmits the voice (step 135) and releases the floor (step 140).

As illustrated in FIG. 1, each time a party to a dispatch communication wants to talk that party must actuate and release the dispatch button. This is much different from interconnect communications in which a party can speak at any time during the call without actuating and releasing a button. The difference between the manner in which parties to a dispatch call communicate compared to parties of an interconnect call communicate is due to the half-duplex nature of dispatch communications and the full-duplex nature of interconnect communications. Because interconnect communications is how people communicate over landline telephones, some people have difficulty performing dispatch communications.

In view of the above-identified and other deficiencies of conventional systems and methods, the present invention provides systems and methods for button-independent dispatch communications. In accordance with the present invention, a dispatch station receives voice information and determines whether a floor of the dispatch call is open. When the floor is open, the dispatch station seizes the floor and transmits the voice information. When the floor is not open, the dispatch station stores the voice information and transmits the voice information once it is able to seize the floor. The dispatch station performs these functions independent of whether a dispatch button on the dispatch station is actuated.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
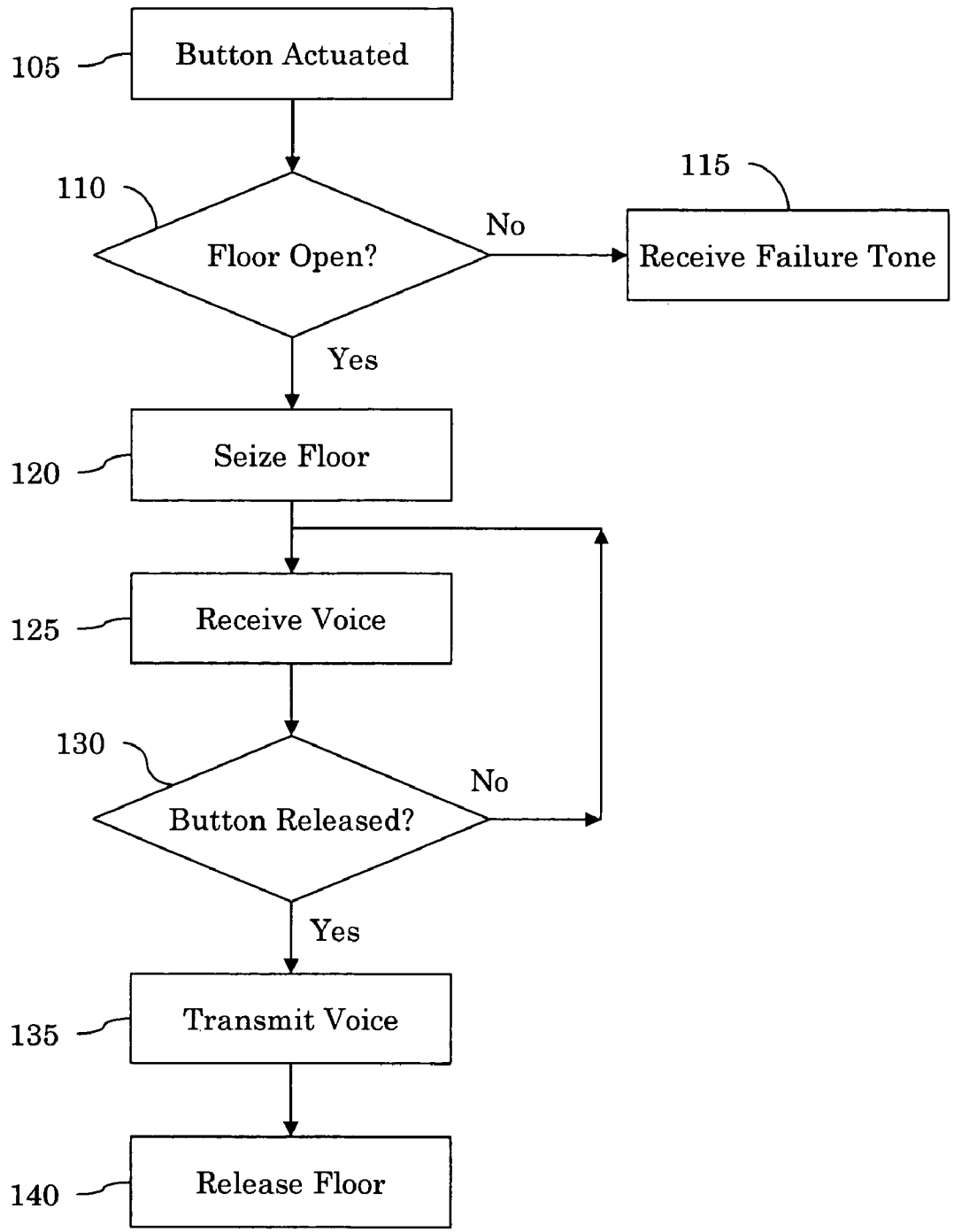
FIG. 1 is a flow diagram of a conventional method for dispatch communications.
Figure 2:
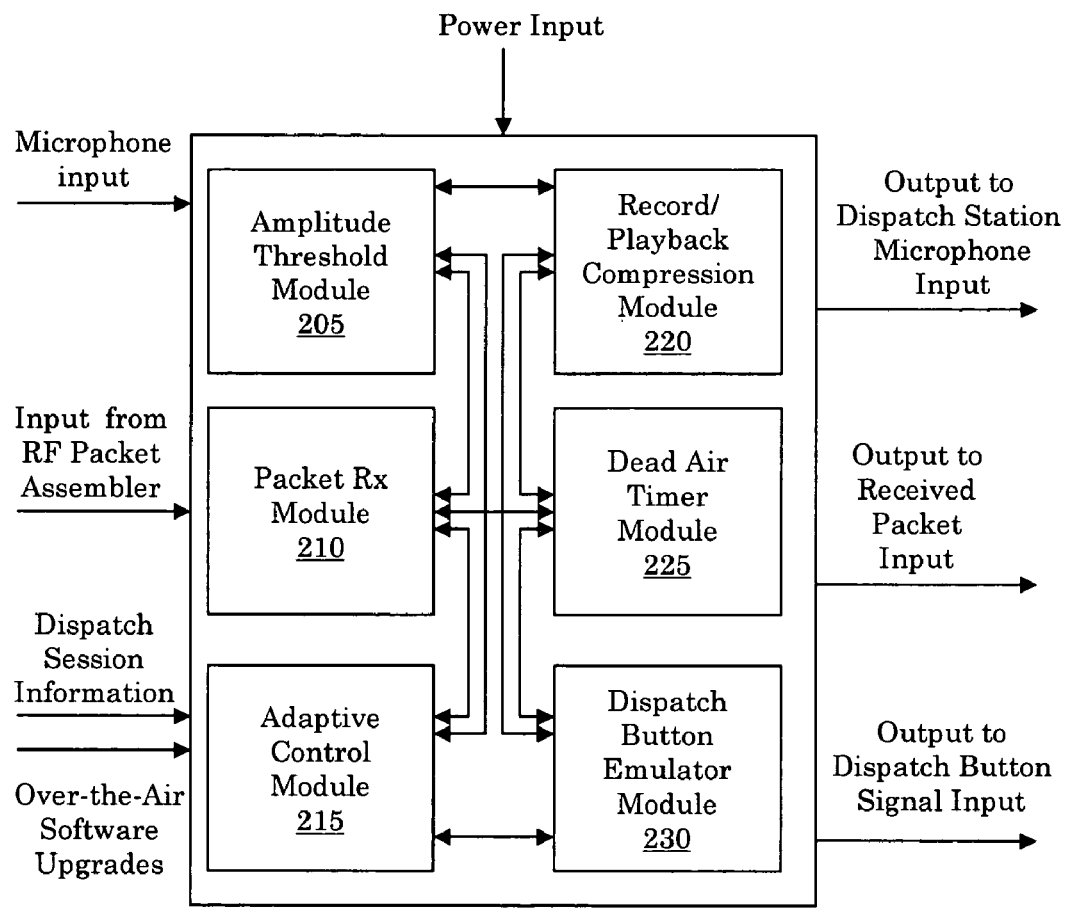
FIG. 2 is a block diagram of an exemplary device for button-independent dispatch communications in accordance with the present invention.

FIG. 2 is a block diagram of an exemplary device for button-independent dispatch communications in accordance with the present invention. Device 200 can be implemented in a processor executing code loaded from a memory, application specific integrated circuit (ASIC), field programmable gate array (FPGA), and/or the like. The functionality of device 200 can be implemented on the same hardware used to support other functions of the dispatch station (e.g., integrated into a dispatch station's main processor), or can be implemented as a separate piece of hardware.

Device 200 includes inputs for power, a microphone, an output from a radio frequency (RF) packet assembler, dispatch session information and over-the-air software upgrades. Device 200 includes outputs for the microphone input, the packets received from RF packet assembler and an output to a dispatch button signal input.

Device 200 includes an amplitude threshold module 205, packet receiver module 210, adaptive control module 215, record/playback compression module 220, dead air timer module 225 and dispatch button emulator module 230. Amplitude threshold module 205 monitors the microphone input to determine if there is voice information for encoding and to identify brief periods of silence within a voice sample for compression by record/playback compression module 220. Packet receiver module 210 monitors the dispatch packet stream and outputs signals indicating whether the floor is open or in use. Record/playback compression module 220 stores the received voice and plays back voice samples based on the received signals. In addition to the use of this module described below in connection with the method of FIG. 3, the stored voice can be sent based on an event trigger or time.

Dead air timer module 225 detects the end of a voice sample and signals the floor release to dispatch button emulator module 230. Dispatch button emulator module 230 activates or deactivates the dispatch station's transmission circuits based on the received signals. Specifically, this module sends signals to the dispatch button input identifying whether the dispatch button should enter a button actuation or release state.

In addition to the modules described above in connection with the method of FIG. 3, device 200 includes adaptive control module 215. This module is arranged to adjust the operation of the other modules by collecting information on the calls conducted using the button-independent dispatch functionality. For example, adaptive control module 215 can sample ambient noise levels before speech begins for a brief period of time and/or sample initial voice amplitude values following call initiation to adjust the threshold employed by amplitude threshold module 205. Adaptive control module 215 can also adjust the threshold employed by amplitude threshold module 205 based on voice characteristics of the person speaking into the microphone of the dispatch station. In addition, adaptive control module 215 can utilize call information, such as calling party, geography, past adaptations and/or the like, to adjust the parameters employed by record/ playback compression module 220 and/or dead air timer module 225. For example, adaptive control module 215 can adjust the parameters employed by dead air timer module 225 based on information provided by dispatch button emulator module 230 regarding the frequency of floor exchanges and/or floor drops and re-acquisitions by the same party. Adaptive control module 215 can also adjust the call volume based on information from the other modules. Adaptive control module 215 can adjust parameters of dead air timer module 225 based on changes made at the dispatch station on the other side of the conversation. This can be implemented by the dispatch stations of a conversation sharing histographic information, speech patterns and the like to assist each other in the adaptation of parameters employed for button-independent dispatch communications.

Figure 3:
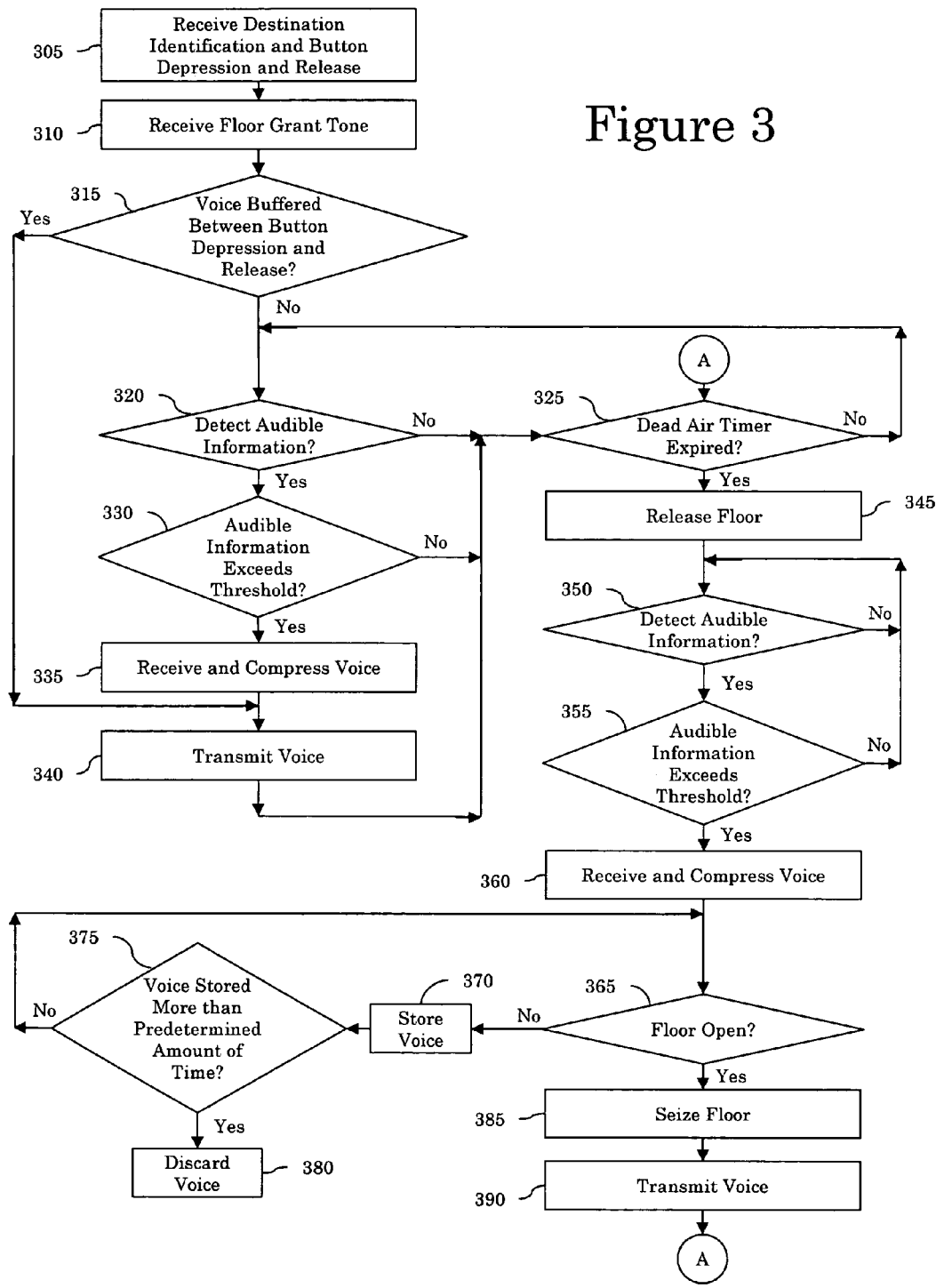
FIG. 3 is a flow diagram of an exemplary method for button-independent dispatch communications in accordance with the present invention.

FIG. 3 is a flow diagram of an exemplary method for button-independent dispatch communications in accordance with the present invention. A dispatch communication is initiated when the dispatch station receives a destination identification (e.g., a telephone number, universal fleet mobile identifier (UFMI), session initiation protocol (SIP) address, and/or the like) and the depression and release of the dispatch button (step 305). When the destination is available, the dispatch station receives a floor grant tone (step 310). Record/playback compression module 220 then determines whether voice has been buffered between depression and release of the button (step 315). When voice has been buffered ("Yes" path out of decision step 315), then the dispatch station transmits the voice (step 340).

When voice has not been buffered ("No" path out of decision step 315), then the dispatch station then determines whether it has detected audible information received from the microphone input (step 320). When the dispatch station has not detected audible information from the microphone input ("No" path out of decision step 320), then dead air timer module 225 determines whether the dead air timer has expired (step 325). When the dead air timer has not expired ("No" path out of decision step 325), the dispatch station will continue to monitor the microphone input for audible information (step 320).

Figure 4:
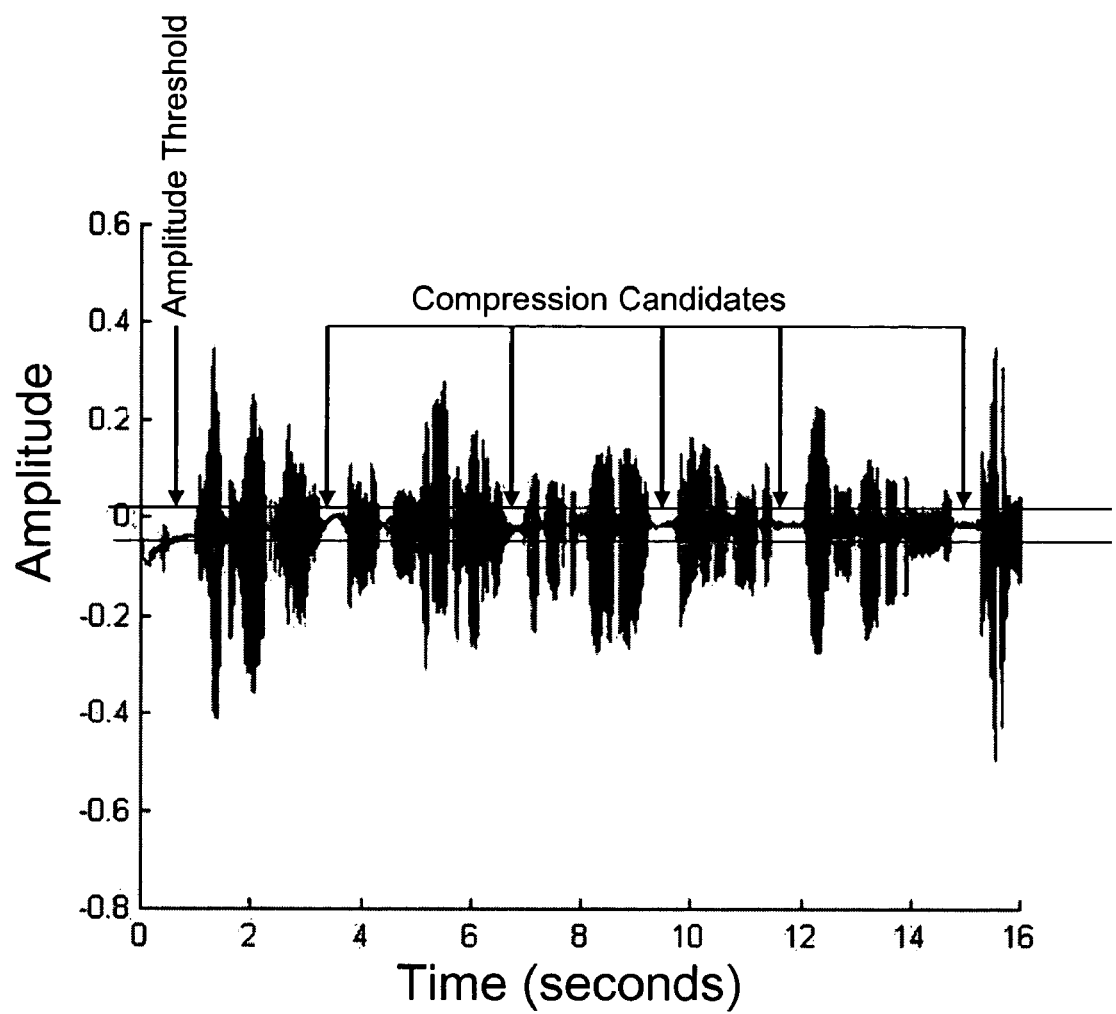
FIG. 4 is a graph illustrating compression of voice in accordance with exemplary embodiments of the present invention.

When audible information is detected from microphone input ("Yes" path out of decision step 320), then amplitude threshold module 205 determines whether the detected audible information exceeds a threshold (step 330). Specifically, only audible information that exceeds an amplitude threshold is determined to be voice information. Accordingly, when the audible information does not exceed the threshold ("No" path out of decision step 330), the audible information is considered as background noise and dead air timer module 225 then determines whether the timer has expired (step 325). When the audible information exceeds the threshold ("Yes" path out of decision step 330), record/playback compression module 220 receives and compresses the voice (step 335). Specifically, referring now to FIG. 4, the silent portions of the voice information signal due to pauses in speech (e.g., where no signal exceeds an amplitude threshold for a period of time, such as 200 milliseconds), can be compressed to a smaller silent portions, such as 25 milliseconds. The receiving dispatch station can continue to playback the compressed signal until real-time is reached and/or the dead air timer expires.

Returning to FIGS. 2 and 3, record/playback compression module 220 then provides the voice to the output to dispatch station microphone input (step 340) and then dead air timer module 225 determines whether the dead air timer has expired (step 325). When the dead air timer has expired ("Yes" path out of decision step 325), then the dispatch button emulator module 230 sends a signal to dispatch button signal input identifying that the dispatch button release state should be entered and the floor should be released (step 345).

After the floor has been released amplitude threshold module 205 determines whether it has detected audible information received from the microphone input (step 350). When amplitude threshold module 205 does not detect any audible information ("No" path out of decision step 350), then amplitude threshold module 205 continues to monitor the microphone input for audible information (step 350). When amplitude threshold module 205 detects audible information from the microphone input ("Yes" path out of decision step 350), then the module determines whether the audible information exceeds the threshold (step 355). When the audible information does not exceed the threshold ("No" path out of decision step 355), then amplitude threshold module 205 continues to monitor for audible information received from the microphone input (step 350).

When the audible information received from the microphone input exceeds the threshold ("Yes" path out of decision step 355), record/playback compression module 220 receives and compresses the voice (step 360). Dispatch button emulator module 230 then determines whether the floor is open based on signals received from packet receiver module 210 (step 365). When the floor is not open ("No" path out of decision step 365), record/playback compression module 220 stores the voice (step 370), and the module determines whether the voice has been stored for more than a predetermined amount of time (step 375). The predetermined amount of time can be a user setting and/or a system setting. The predetermined amount of time can be, for example, two seconds, and can be modified by adaptive control module 215 based on an amount of voice content being discarded (i.e., bits of voice that are dropped). When the voice has been stored for more than a predetermined amount of time ("Yes" path out of decision step 375), then the voice is discarded (step 380).

If, however, the voice has not been stored a predetermined amount of time ("No" path out of decision step 375), then dispatch button emulator module 230 determines whether the floor is open (step 365). Once the floor is open ("Yes" path out of decision step 365), then dispatch button emulator module 230 sends a signal to the dispatch button signal input to enter a dispatch button actuation state and seize the floor (step 385). Record/playback compression module 220 then transmits the voice (step 390), and dead air timer module 225 determines whether the dead air timer has expired (step 325).

In the description above, systems and methods for button-independent dispatch communications are provided. By monitoring the amplitude of audible information received from a microphone, the present invention can determine when to seize the floor of the dispatch communication, and by monitoring the "dead air", the present invention can determine when the floor of the dispatch communication should be released.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for dispatch communication, the method comprising the acts of:
    receiving, by a dispatch station, audible information;
    determining whether an amount of time has passed since receiving the audible information;

releasing control of a floor of the dispatch communication after the amount of time has passed independent of a manipulation of buttons of the dispatch station;

determining whether a floor of the dispatch communication is open;

storing the received audible information when the floor is controlled by another dispatch station;

transmitting the stored audible information once the floor of the dispatch communication is open; and adjusting the amount of time based on receipt of a plurality of segments of audible information.

2. The method of claim 1, further comprising the act of:
determining whether the audible information exceeds a threshold, wherein only audible information exceeding the threshold is transmitted.

3. The method of claim 2, further comprising the act of:
adjusting the threshold based on receipt of a number of segments of audible information.

4. The method of claim 2, further comprising the act of:
adjusting the threshold based upon ambient noise detected during initiation of the dispatch communication.

5. The method of claim 2, further comprising the act of:
adjusting the threshold based upon the audible information.

6. The method of claim 1, further comprising the acts of:
compressing the received audible information.

7. A communication device, comprising:
an amplitude threshold module arranged to receive audible information from a microphone input;

a timing module arranged to receive the audible information the microphone input, and arranged to produce a signal indicating an end of audible information;

a dispatch button emulator module arranged to receive the signal from the timing module, and arranged to provide a signal to a dispatch button actuation detection circuit of a dispatch station; and an adaptive control module arranged to
receive information from the dispatch button emulator module regarding frequency of floor exchanges or floor drops and re-acquisitions by a same party, and
provide adjusted parameters to the timing module based on the frequency of floor exchanges or floor drops and re-acquisitions by the same party.

8. The communication device of claim 7, wherein the device is a processor in the dispatch station.

9. The communication device of claim 8, wherein the processor is separate from a main processor of the dispatch station.

10. The communication device of claim 8, wherein the processor is a main processor of the dispatch station.

11. The communication device of claim 8, wherein the modules are computer readable code loaded into the processor from a memory.

12. The communication device of claim 7, wherein the modules are components of a field programmable gate array (FPGA) or an application specific integrated circuit (ASIC).

13. The communication device of claim 7, further comprising:
a recording module arranged to receive the audible information from the microphone input and store the audible information.

14. The communication device of claim 13, wherein the recording module is arranged to compress the audible information.

15. The communication device of claim 7, wherein the adaptive control module is further arranged to receive parameters used by the amplitude threshold module, timing module and dispatch button emulator module, and to adjust the parameters.

16. A dispatch station, comprising:
a microphone;
a dispatch button actuation detection circuit;
a timing module arranged to receive the audible information the microphone input, and arranged to produce a signal indicating an end of audible information;

a dispatch button emulator module arranged to receive the signal from the timing module, and arranged to provide a signal to the dispatch button actuation detection circuit;

a compression module arranged to compress silent portions of the audible information; and an adaptive control module arranged to utilize call information, including calling party and past adaptations, to adjust parameters of the timing and compression modules.

* * * * *